US007004396B1

(12) United States Patent
Quine et al.

(10) Patent No.: US 7,004,396 B1
(45) Date of Patent: Feb. 28, 2006

(54) SYSTEM AND METHOD FOR GROUPING MAIL PIECES IN A SORTER

(75) Inventors: Douglas B. Quine, Bethel, CT (US); Christopher A. Baker, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/027,138

(22) Filed: Dec. 29, 2004

(51) Int. Cl.
*G06K 13/00* (2006.01)
*G06K 13/24* (2006.01)

(52) U.S. Cl. ........................................ 235/475; 235/485

(58) Field of Classification Search ................ 235/385, 235/475, 483, 485; 209/584, 586
See application file for complete search history.

(56) References Cited

U.S. PATENT DOCUMENTS 5,823,529 A * 10/1998 Mandel et al. .............. 271/296
6,365,862 B1 * 4/2002 Miller et al. ................ 209/584
6,679,491 B1 * 1/2004 Luebben et al. ............ 271/150
6,748,294 B1 * 6/2004 Overman et al. ........... 700/224
6,822,182 B1 * 11/2004 Kechel ........................ 209/584

OTHER PUBLICATIONS

Elsag brochure—Shingle Technology (undated).

* cited by examiner

*Primary Examiner*—Daniel Stcyr
*Assistant Examiner*—April Taylor
(74) *Attorney, Agent, or Firm*—Michael J. Cummings; Charles R. Malandra, Jr.; Angelo N. Chaclas

(57) ABSTRACT

A mailpiece sorter system including a mailpiece feeding assembly operative to selectively feed mailpieces singularly or in groupings of mailpieces consisting of more than one mailpiece and a mailpiece sortation assembly operatively coupled to the mailpiece feeding assembly. The mailpiece sortation system includes a plurality mailpiece sortation bins and a diverting assembly for directing fed mailpieces into a predetermined mailpiece sortation bins. A control system is operatively coupled to the mailpiece feeding assembly to determine which mailpieces are to be singularly fed from said feeding assembly and which mailpieces are to be fed from said feeding assembly in a predetermined grouping of mailpieces.

3 Claims, 9 Drawing Sheets

SYSTEM AND METHOD FOR GROUPING MAIL PIECES IN A SORTER

FIELD OF THE INVENTION

The present invention relates to media item handling equipment and more particularly to a system and method for grouping mail pieces in a sorter.

BACKGROUND OF THE INVENTION

Paper handling systems frequently include folding subsystems, inserter subsystems and sorting subsystems in combination with other subsystems such as postage meters, and stackers, although each of these subsystems can be separate stand-alone systems.

Posts and private carriers frequently provide discounts to mailers who presort mail. The discounts vary from country to country and are often dependent on the level of presort. The more specifically the mail has been sorted in relation to delivery by the Post or carrier, the greater the discount. In the United States, mail sorting equipment reduces the costs of sorting mail, which may be from $45 per 1,000 pieces when manually sorted, to $3 per 1,000 pieces when automatically machine sorted. Furthermore, when mailers presort mail before presentation to the United States Postal Service (USPS), the postal discounts from the full postal charge for first class mail presently provided to the mailer by the USPS can be as high as 9.5 cents per mail piece. This discount may translate into savings for the mailer of as much as $3,800 per hour in postage alone if a sorter is processing 40,000 mail pieces per hour. The actual savings to the mailer may be greater since the capital cost of the equipment can be more than covered by the labor savings since such equipment can be operated with as few as two operators rather than the more than 60 which may be required to achieve such a rate manually.

These mail sortations implemented by the mailer, by the Posts or the private carriers often utilize a multiple pass radix sort algorithm. The United States National Institute of Standards and Technology defines a radix sort as a multiple pass distribution sort algorithm that distributes each item to a bucket according to part of the item's key beginning with the least significant part of the key. After each pass, items are collected from the buckets, keeping the items in order, then redistributed according to the next most significant part of the key. In a mailing system radix type sortation, the key can be the delivery address delivery code such as a ZIP code and the bucket can be the destination sortation bin. Use of a radix sort allows mail pieces to be sorted into delivery point sequence (carrier walk sequence) and eliminates the need for the delivery person to sort the mail before delivery. However, in implementing multipass sortations of this type, to achieve a delivery point sequence requires that the ordering of mail from prior sortations be maintained when the mail pieces from each of the sortation bins are combined for the next sortation pass.

There is great interest on the part of Posts, private carriers and mailers in improving the efficiency of the sortation process since it reduces the need to purchase additional equipment, to allocate space for the significant footprint associated with each machine, to merge multiple mail streams and to utilize additional equipment operators. Prior efforts to increase the sortation processing speed have involved advancing and separating mail in a sorter at ever increasing speed so that one piece is separated at a time from the stack at higher speed, transported to the sortation station at higher speed and moved or diverted into the sortation bins at higher speed. Such speed increases carry a high cost for implementation, narrow the range of mail that can be processed, and increase the damage to mail when jams occur.

Paper handling and mechanical considerations make improvements in sortation throughput difficult to achieve and technical improvements are typically very incremental. Typical throughput for mail piece sortation equipment has presently peaked at roughly between 30,000 and 40,000 pieces per hour, depending on the length of the mail pieces and their uniformity with peak transport speeds of about 180 inches per second (ips). Moreover, depending upon the particular equipment, at higher transport speeds, mail piece diverter gates may not reliably divert the mail pieces, the tracking logic may not reliably differentiate the mail pieces, the printers may not reliably and correctly print barcodes on the mail pieces, and the scanners may not reliably read the barcodes on mail pieces.

Typically, mail pieces are transported in sortation and other equipment along a path parallel to the mail piece long axis. The transport of the mail piece can be with the mail piece oriented on its edge or with the mail piece oriented on its side. The long mail piece axis transport helps to achieve good control of the mail piece while also allowing a gap in the belting or transport mechanism to permit viewing of the mail piece for scanning by an optical character reader (OCR) or a barcode reader (BCR). While manufacturers have experimented with transporting the mail pieces in a path perpendicular to their long axis to increase throughput, the variable lengths of mail pieces, the need to precisely position the printed information such as a USPS POSTNET barcode, and the difficulty of diverting and stacking mail complicate this approach.

In general, sortation throughput has been achieved through incremental increases in mail transport belt speed, although at higher speeds there may be a need for a greater gap for a given diverter response time and faster diverter gates. Improvements are thus incremental and also expensive. Prior USPS solutions have utilized several approaches in existing systems to overcome these problems. USPS accepts presorted trays of mail arranged by 5 digit destination (ZIP) code. This allows a single handling operation (at each decision point before the destination post office) for each tray containing hundreds of mail pieces rather than requiring that each mail piece be sorted and processed individually. Another USPS approach, such as the prototype Delivery Barcode Sorter (DBCS), employed multiple feeders feeding mail into one transport to allow manually and automatically processed mail to be merged. This approach does not increase automated mail transport throughput but rather allows full production speeds to continue while mail is being processed manually. The merging of two mail streams into a single sortation helps keep the machine running continuously since manually processed mail is very slowly produced. In yet another approach, the USPS flats sorting machine (FSM) model 775 systems with 4 feed stations at one end were modified (renamed FSM 881) to place 2 feed stations at each end of the machine. This allowed mail to be introduced at one end into transport carriers that had become empty because the mail had been out sorted at an earlier point in the transport. None of these solutions, however, are able to increase the transport capacity beyond a single envelope at a time passing down the transport path; they merely attempt to speed up existing processes and attempt to ensure that there is no unused capacity in the transport path.

SUMMARY OF THE INVENTION

The present invention is usefully employed with various media item processing equipment, including sortation equipment, to greatly increase the media item process speed (throughput), such as the sortation of media items such as mail pieces.

It has been discovered that the sortation process can be controlled and made significantly more efficient by being controlled to group media items being sorted to go to the same sortation bin. This is achieved, for example, by shingling, or partially or fully overlapping multiple media items together as a group. This reduces the space and transport time those mail pieces occupy as they pass through the transport toward the sortation or other processing station such as wrapping or bundling mail pieces. This media item grouping increases processing throughput by treating a series of media items as a single group or packet of items rather than individual separate media items.

The present invention provides an arrangement for a mail sorting system to improve mail-sorting capabilities by, for example, altering the control arrangement that normally provides gaps between mail pieces being processed. This is achieved through control of a separator system, such as by controlling the operation of a feeder feeding a group of mail pieces or a hold station assembling a group of mail pieces. The present invention enables items destined to the same sortation bin to pass through the transport as a single packet or group of mail pieces. In one arrangement of the present invention, the separator system permits the feeder to group feed multiple media items during the initial stages of separating so that items destined to the same sortation bin remain as a group throughout the transport. In another arrangement of the present invention, the separator system permits the feeder to feed multiple media items during the initial stages of separating and merge them so that media destined to the same sortation bin pass as a group down the transport. Media item grouping can be also achieved by other arrangements, such as employing a controllable hold station. This then establishes, no matter what controllable separator system is employed, one gap between two different groups of shingled, partially or fully overlapped media items rather than requiring separate gaps between each and every item being processed or sorted.

Aspects of the present invention enable radix sortation of groups of media items with various types of sortation equipment because the invention meets the requirement of a radix sort algorithm that media items be processed in sequenced or layered sets. This includes sortation equipment having sortation bins on both sides of the media item transport path, media items traveling unescorted on the transport path and media items traveling escorted on the transport path such as in a carrier into which the media item or group of media items are fed. Sortation systems employing carriers are commonly used for flats mail processing. The present invention overcomes sequencing problems associated with such two-sided sorters and carrier style sorters and enables media item throughput on a sorting machine to be significantly increased without the need for dramatic improvements in the transport or media item diverting technology. Throughput may be improved with currently available sortation machine technology without requiring significant increase in system cost, machine operator cost, or the footprint of the sortation equipment. Since the invention requires changes only in the feeder section of the sorter, it provides a way to increase sortation and other equipment processing speed that is retrofit onto various types of existing sortation and other equipment. This avoids solutions for sequencing flats or increasing letter mail processing throughput that require purchase of completely new capital equipment.

As a feature of the present invention, the system may process media items so that the media items in a group of media items are placed in the correct layering sequence within the group to preserve ordering integrity for radix multipass sortations. The system operates to add items to a group on the appropriate side of the group before the group is released to pass down the transport to the appropriate destination sortation bin.

A method for processing of media items embodying the present invention includes a separator system feeding a series of media items onto a transport system. The separator system is controlled to feed onto the transport system groups of sequential media items having similar information (for that pass) and to separate and feed onto the transport system sequential media items having dissimilar information spaced apart on the transport system from the group of media items having similar information.

In accordance with a feature of the present invention, the separator system is controlled to limit the thickness of each group of media items not to exceed a predetermined thickness. The separator system is also controlled to separate and feed onto the transport system any subsequent media items which would cause said group of media items to exceed the predetermined thickness. This helps ensure that the transport system will not jam because of an excessively thick media item group and that for carrier type sorters, the carrier capacity will not be exceeded.

In accordance with another feature of the present invention, a series of media items are fed onto the transport system transport path for sortation into two or more sortation bins. The separator is controlled such that adjacent media items destined for the same sortation bin are transported along said transport path as a group of media items to the same sortation bin and such that adjacent media items destined for different sortation bins are separated for separate transport along the transport path to the different sortation bins.

In accordance with yet another feature of the present invention the order of said media items within groups created by said separator system is controlled such that subsequent sortation of groups of media items will further differentiate the media items by media item order sequence of media items in each of the groups of media items.

A sorter system for sorting media items embodying the present invention includes a transport for the media items, the transport having a media item transport path, and a plurality of sortation bins, with each sortation bin operably connected to the media item transport path. A controllable separator is connected to the media item transport path and is controllable to separate media items and to group media items, for transport on said media item transport path to one of said plurality of sortation bins. A controller is coupled to said controllable separator. The controller controls the controllable separator to operate such that adjacent media items destined for the same sortation bin are grouped for transport on said media item transport path as a group of media items and such that adjacent media items destined for a different sortation bin are separated from the group of media items for separated transport on said media item transport path to the different sortation bin.

In accordance with a feature of the present invention the controllable separator includes an order diverter. The order diverter is operable to order the media items within groups created by the controllable separator depending on the order required within the group of ordered media items for a specific destination sortation bin.

In accordance with another feature of the present invention the controllable separator is controllable to limit the thickness of each group of sequential media items destined for said same sortation bin not to exceed a predetermined thickness. The controllable separator is also controllable to separate from the group of media items for separated transport on the media item transport path to the same sortation bin any subsequent media items destined for the same sortation bin where such subsequent media items would cause the group of media items to exceed the predetermined thickness.

In accordance with yet another feature of the present invention a second controllable separator is connected to said media item transport path and controllable to release separate media items and group media items, for transport on the media item transport path to one of the plurality of sortation bins.

BRIEF DESCRIPTION OF THE DRAWINGS

Reference is now made to the various figures wherein like reference numerals designate similar items in the various figures and in which.

DETAILED DESCRIPTION OF THE PREFERRED EMBODIMENT

Figure 1:
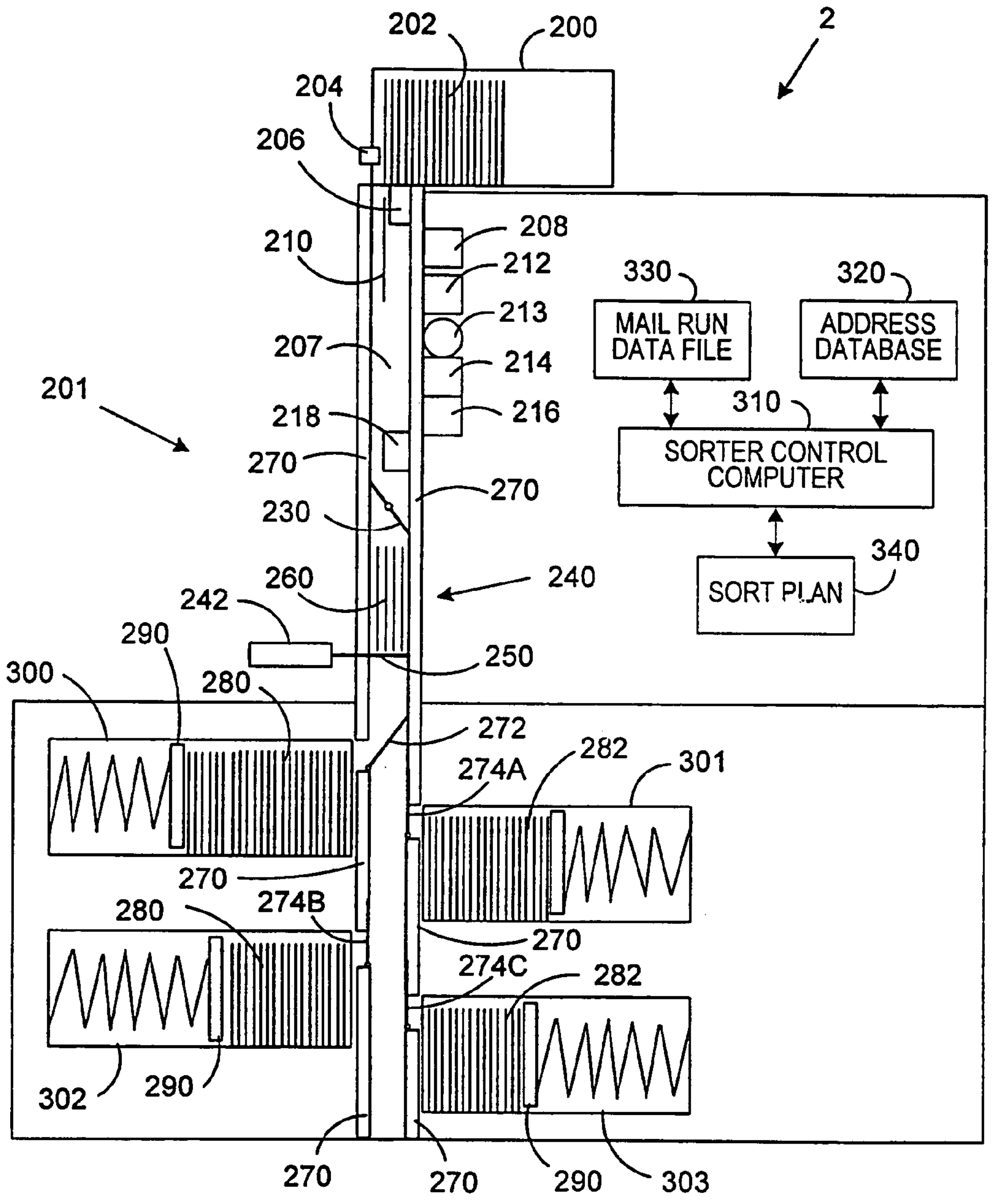
FIG. 1 is a diagrammatic view of a mail piece sorter system embodying the present invention.

The sorter systems shown in the various figures provide a way for mail-sorting machines to improve mail sorting capabilities by controlling the equipment that provides gaps between mail pieces being run through the equipment. Mail destined to the same sortation bin passes through the equipment transport to the sortation bin as a single group or packet. The separator system operates during the initial stage of processing multiple mail pieces so that subsequent mail pieces destined to the same sortation bin are collected together as a group. This then establishes one gap between two groups of mail pieces rather than requiring separate gaps between each of many pieces of mail. The result is a more compact train of mail pieces with a shorter required transit time for a given volume of mail pieces to get to a given downstream sortation bin.

When mail information is available, the system may employ this existing information about the mail to determine which mail pieces to group together as the mail pieces are fed into the sorter system. Information about each mail piece may be available, for example, from a Mail Run Data File (MRDF), manifest, a printed bar code, or the printed destination address. If a MRDF or manifest provides a full inventory of the mail pieces and no reordering of the pieces is required, the required number of pieces for a particular destination bin may be counted and fed from or extracted from the stack without ever being fully separated or singulated into separate individual mail pieces. This is similar to the process of counting paper currency in a bundle and then extracting a selected number of bills from the bundle as a unit.

If mail information is not available for each prebarcoded mail piece, or if individual piece verification is desired, then a barcode reader may scan and identify each piece of prebarcoded mail at the separator system station. If the mail piece shares a destination with the previously scanned mail piece, then multiple mail pieces can be grouped together in the separator system station before the group of mail pieces are released into the sortation transport.

If no bar code is printed on the mail and mail information is not available (or additional reliability is desired), the mail pieces may be scanned with an optical character reader (OCR) and address lookup system to identify the destination bin. Again if the mail piece shares a destination with the previously scanned mail piece, then multiple mail pieces can be grouped together in the separator system station before the group of mail pieces are released into the sortation transport. Where a MRDF or manifest is available, the matching of expected information may still be implemented to provide additional reliability in the process and is an optional step.

If the mail piece thickness is known, the number of mail pieces to run together can be controlled based on the thickness of each group or packet. This thickness depends on the transport capabilities, for example, a total thickness of 1/4" or 3/8" may be a typical group or packet thickness for current sorting machines. With letter mail pieces stacking at 250 pieces per foot (0.05 inches thick each), it may be possible to group as many as 7 pieces per packet. For post cards stacking at 1,700 cards per foot (0.007 inches thick), it may be possible to group as many as 50 cards per packet, depending upon the capabilities of the sorter. Throughput improvements therefore may be very dramatic when sequential mail pieces are destined to a common sortation bin or processing station. The group of mail pieces will appear to the sortation equipment tracking logic as a single mail piece and pass down the transport and be diverted into the correct bin as if the group were a single mail piece. Counting and reporting functions of the equipment can be based upon the data gathered at the separator system station and initial mail piece scanner or at any point in the system where the individual mail pieces are being separately handled or logically tracked.

Mail piece sort plans employed by Posts, private carriers and mailers may be highly complex. Adjacent destination codes, such as ZIP codes or nearby addresses, are not the operational issue in controlling the sortation equipment. The operational issue is the sortation bin that the mail pieces are destined to be moved into on the current sortation pass through the sorter. For instance, in a radix sortation, the first delivery point on many carrier routes in a city may all be placed in sortation bin 1 on a multipass sortation. In this case, they could be bundled together on a first pass. Mail destined to the same household can be bundled together on all passes. This bundle of mail pieces has no physical connection (there is no glue, packing material, or bands) so they can be easily independently processed on each subsequent pass through the sorting system.

When on the first pass, the mail destination is unknown and the mail is not pre-barcoded, the mail pieces are optical character reader (OCR) scanned and looked up in a database to determine the correct delivery mail codes, such as the USPS POSTNET barcode, which will then be printed on the mail piece. In many sorting systems, the OCR or bar code reading (BCR) subsystems are typically located in the transport after the mail has been released into the transport track and is moving at full speed. In such cases, the scanning, lookup and printing steps may desirably be placed in a different part of the workflow or operated in parallel feeding arrangements. This enables the speed enhancement benefit of grouping mail pieces on the first pass through the system and also not being required to slow down the full mail transport speed and overall system processing speed to insure reliable scanning, lookup and printing mail piece processing steps. The 11 digit ZIP code encoded in the USPS POSTNET barcode defines the exact delivery point. The 11 digit ZIP code can be added to a manifest or register of mail pieces being sorted for efficient processing in subsequent passes. Once this information is known, it may be employed to determine the opportunity to group a specific mail piece with an adjacent mail piece. Thus, grouping of mail for the initial mail sortation process uses local and immediately obtained information, whereas grouping mail in future sortation operations can be enhanced by having that information (mail piece sequence in each sortation bin) available to the system prior to the commencement of such future sortation operation.

Where the sortation system has sortation bins on both sides of the mail transport path, the order of the grouped mail pieces needs to be controlled, depending on the destination sortation bin for a radix sort. When mail is stacked together, the layering of the mail pieces is not the same for bins on opposite sides of the transport. In one case the stack grows from the front, mail pieces are being added into the sortation bin on the address side of the previous mail piece placed into the sortation bin. In the alternative case, the stack grows from the back, mail pieces are being added into the sortation bin adjacent to the back surface of the previous mail piece placed into the sortation bin. Thus, if the sorter is one in which mail stacks on both sides of the machine transport path, on one side of the machine transport path the mail is facing (envelope address side) outwards, away from the transport path and on the other side of the machine transport path the mail is facing (envelope address side) inwards, toward the transport path. All mail pieces in such a system would be facing in the same direction (e.g. right) as viewed in FIGS. 1, 2, 3, 5, and 6.

When mail passes down the transport path, it develops opposite layering when it is sorted to the right or left of the transport path. Mail In the left side sortation bin (on the left side of the transport path) may have the mail address side facing to the right and toward the transport path with the top piece being the last mail piece to arrive in the bin. In the right sortation bin (on the right side of the transport path) the mail address side will also be facing to the right but facing away from the transport path. The last mail piece is at the back of the stack. Thus, when mail is removed from the sortation bin and held with the address side (face) of the envelope facing the operator, the right side sortation bins will have the mail in reverse order of that seen in the left side sortation bins. From one sortation bin, the address face of the last item sorted into the sortation bin will be at the top of the mail stack facing and closest to the operator. From a sortation bin on the opposite side of the transport path, the address face of the last item sorted into the sortation bin will be hidden from the operator, at the back of the mail stack and the furthest mail piece from the operator. If this mail is being sequenced in this manner within the sortation bins and if the mail is to be rerun as in a RADIX-type sortation to create a sequenced set, this opposite ordering of the two mail stacks will be a problem for further sortation processing. If, however, all of the sortation bins are on a single side of the transport from the viewpoint of the mail piece transport path, then opposite layering will not occur and will not be a problem for further sortation It should be noted that a "U" shaped transport path with sortation bins on the same side of the transport path is a single side transport, even though there is mail on both the right and left sides of the machine. This ordering problem for sorter systems with sortation bins on both sides of the transport path is overcome by the present system by including an arrangement to control the ordering of the mail groups. Ordering of the mail pieces in each mail piece group is determined and is ordered based on the destination sortation bin for that group of mail pieces.

It is not possible to flip the stack of mail over to allow all mail pieces to be in the same physical order because then some will be facing in one direction and others will be facing in the other direction. The barcode reader and OCR system are only designed to read one side of the envelope. Furthermore, when mail of mixed orientation is processed on automated sorting equipment the jam rates increase significantly because the flap orientations (which tend to catch and jam) vary from envelope to envelope. Finally, at the delivery point, the delivery person wants all mail to be facing in the same orientation so that the addresses can be confirmed before delivery.

Various other arrangements may be employed as part of the present system. Multiple feeders can be provided in a single input section with presorted mail merging within the feeder. Multiple parallel feeder and input sections can be provided and loaded with mail at the input side of the sorter system. The mail in each feeder and input sections may, if desired, be pre-sorted by the mailer in rough groups, so that each feeder and input sections is loaded with a given group of codes. When the feeders advance the mail, the separator system associated with each feeder and input sections can be operated to group the mail pieces. On sortation passes, it may be possible to merge three or four mail pieces in a mw, resulting in a 200% or 300% increase in throughput (30,000 per hour increases to 90,000 to 120,000 per hour). Multiple feeders may increase the mail piece intake capability of the sorter system and may enable the sorter system to more fully gain the benefits of processing mail pieces in groups or packets.

With the above described arrangements with multiple feeders loaded with presorted mail, mail pieces can be merged across feeders. With multiple parallel feeder and input sections, mail pieces can also be merged across sections. When the same sortation bin destination is determined at two or more feeders, those mail pieces can be merged together into a single group and put onto the sorter transport path. It may also be beneficial to arrange multiple feeders to operate the merge both within an input section and also across feeders which are part of other input sections. Even without any pre-sequencing of the mail, the present arrangement will allow randomly sequenced mail pieces to be merged when they share a destination sortation bin. In a system with 32 sortation bins, statistical probabilities are at least 3% of the mail is going to the same bin as the previous piece, which would result in a 3% increase in throughput. Since mail is not typically generated in random sequence, actual coincidence rates are likely to be higher. Multiple mailings to the same household or other related addresses coming together in the mail stream would result in much higher productivity gains.

Reference is now made to FIG. 1. A mail piece sorter system 2 includes a feeder and input section 201. An input mail feed magazine 200 containing a series of mail pieces shown generally at 202. The magazine 200 includes a sensor 204 to determine when mail pieces are present in the magazine and when the magazine is empty. A pick-off mechanism 206 is provided to feed single, individual mail pieces out of the magazine and onto the sorter transport path shown generally 207. A thickness sensor 208 detects the thickness of each mail piece in transit, such as on edge mail piece 210, on the mail piece transport path 207. Mail piece 210 is traveling unescorted, that is it is being moved along by the transport mail piece drive belts and not by a carrier such as a basket, tray, container or other device. In actual operation the transport belts 207 touch both sides of the mailpiece; they have been separated in the figure for clarity of illustration. A camera and/or barcode reader arrangement 212 is provided along the transport path 207 to image the mail piece 210 or read a barcode which may be printed on the mail piece for use by the sorter control computer 310. A tachometer or speed detector 213 is provided to determine the speed of the mail piece, such as, mail piece 210 on the transport path. The speed information is used to synchronize the line scan imaging of information on the mail piece with the variable speed of the mail piece.

For mail not having a barcode, an optical character reader 214, which may have its input provided by the camera arrangement 212, is employed to obtain information from the face of the mail piece for use by the sorter control computer 310 in controlling operation of the sorter 2. The optical character reader 214 captures the information on the face of the envelope and converts it to machine-readable form. The machine-readable text is standardized through an address database 320, and the destination ZIP code is provided to an ink-jet barcode printer 216 to print a POSTNET barcode on the mail piece. The sort plan 340 identifies the desired sort bin for this destination ZIP code on this sortation pass through the system. An optional additional feeder 218 may be provided along the feed path 207. The optional feeder 218 may be employed in situations where it is desired to group mail pieces together In a shingled format and/or for additional reliability to ensure appropriate singulation and grouping of mail pieces.

Depending upon the particular equipment and particular application, the pick-off mechanism 206 may provide any desired, controlled shingle feeding and may be the only controllable sheet feeding mechanism along the path. An order diverter 230, shown in greater detail in FIG. 2 and whose operation will be described in greater detail hereinafter, is provided to layer mail pieces traveling along the transport path 207 within a hold station shown generally at 240. A series of mail pieces 260, forming a group or packet of on edge mail pieces, are shown in the hold station 240 with a mall retard gate 250 blocking further transit of the mail pieces 260 along the path of travel of the transport 207. The order diverter 230 determines the order in which each of the mail pieces traveling along the transport path 207 are assembled within the hold station 240. The transport belts shown generally at 270 for the transport path 207 are standard and arranged to propel the mail pieces along the transport path 207 and may be segmented with gaps to allow the mail pieces to be sorted off the mail path by a bin diverter, such as bin diverter 272, into a suitable sortation bin. They may also have independently controlled sections to hold and then drive mail from hold station 240. When the mail retard gate is released, the group of mail pieces will move as an unescorted group of mail pieces being moved by the operation of the transport belts which engage and move the group of mail pieces. As will be explained hereinafter, the mail piece and the groups of mail pieces, depending on the particular sortation system, can be moved as escorted mail pieces in carriers to the various sortation bins.

The sorter system 2 includes four sortation bins shown at 300, 301, 302, and 303. Each of the sortation bins includes a bin diverter with bin diverter 272 shown as deployed across the transport path 207 to divert a mail piece into sortation bin 300. A spring-loaded bin paddle 290 moves to allow the additional mail pieces to be added to the mail piece stack. The bin diverters 274*a*, 274*b*, 274*c* (for bins 301, 302, and 303) are shown in their closed position nestled against the mail piece transport belts 270.

The operation of the sorter system 2 is controlled by the sorter control computer 310 under operation of a sortation plan database or program 340. The sortation plan data base program controls the operation of the equipment to sort the mail in delivery point sequence to particular destinations for delivery by a delivery service, such as, a postal service or a private carrier. The sortation plan specifies for particular mail piece data the destination sortation bin for a mail piece on each pass of the radix sort. The sorter control computer 310 may also be operated by employing a mail run data file 330 where the specific information, Including sequence, may be known about each of the mail pieces 202 in the input mail magazine 200. In such instance, the mail processes involving the thickness sensor 208, the camera barcode reader 212, the tachometer 213, OCR 214 and ink-jet printer 216 may not be required to properly process the mail since this information is already available.

Figure 2:
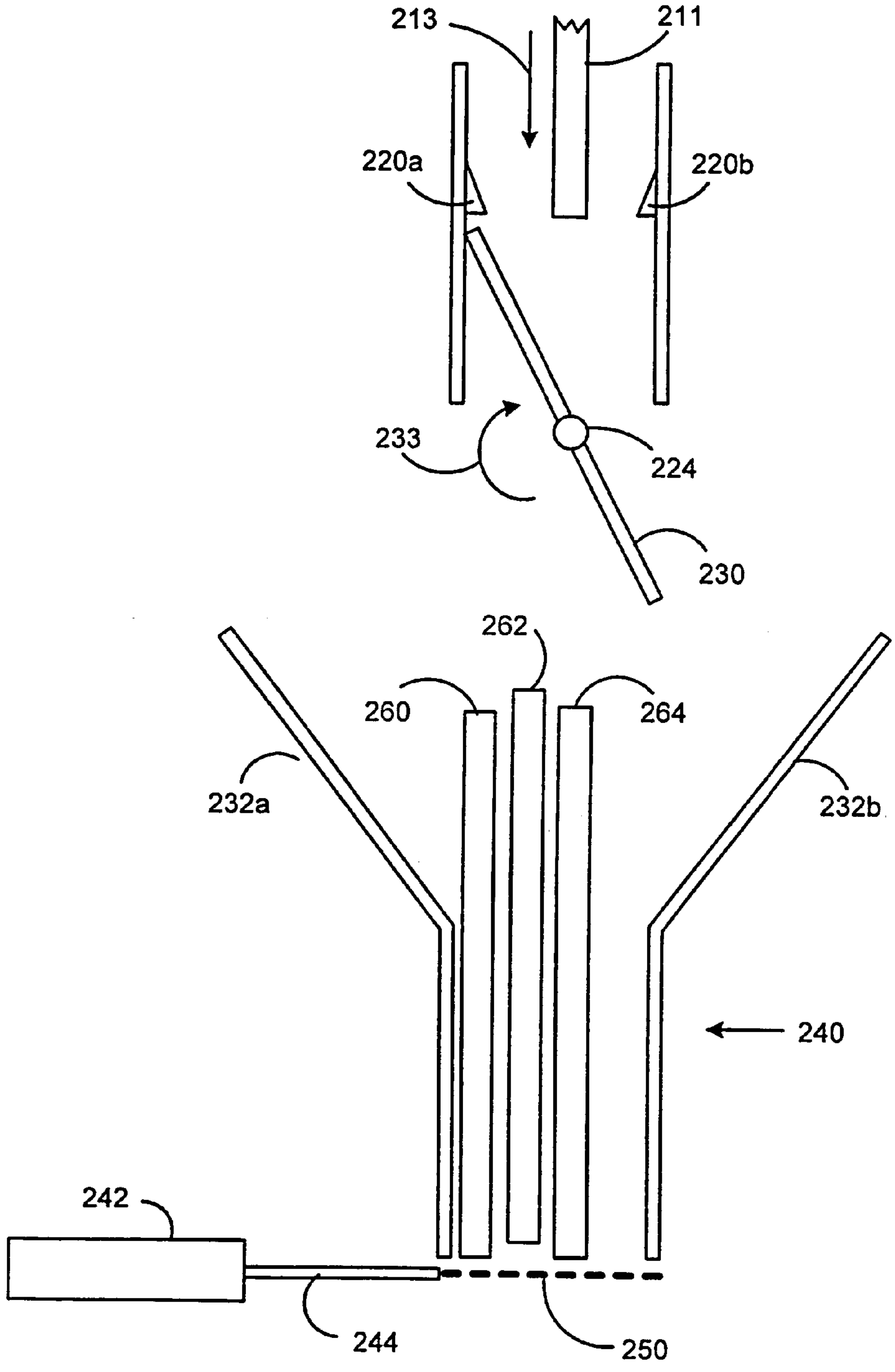
FIG. 2 is an enlarged, detailed top diagrammatic view of the order diverter, hold station and mail retard arrangement shown in FIG. 1 with a group of overlapped mail pieces in the hold station.

Reference is now made to FIG. 2. Mail pieces, such as on edge mail piece 211, traveling unescorted in the direction of the mail transport 207 shown by arrow 213 are diverted by a pivoting diverter gate 230, which pivots around a pivot point 224 positioned within the transport path 207. The gate diverts mail traveling along the transport path 207 into the hold station 240 in a layered (left to right or right to left) format. As presently positioned, the diverter gate 230 is positioned behind a diverter gate tip hider 220*a* to divert mail piece 211 as it travels along path 207 to eventually rest on the right side of mail piece 264, shown in the hold station 240. Alternatively, a recess in the wall for the diverter gate tip can be provided (rather than a gate tip hider) so that the mail piece 211 flows smoothly and does not get impeded in its travel by the leading edge of the diverter gate 230.

The hold station 240 includes a flanged area 232*a* and 232*b* to accommodate and facilitate the flow of the mail pieces into the hold station 240. Thus, mail pieces with the diverter gate shown in its current position, such as, mail piece 211, would flow down the mail piece transit path 207 and slide down the flange 232*b* into its proper position next to mail piece 264 in the hold station 240. If the diverter gate 230 were rotated in the direction of the arrow 233 such that the tip of the diverter gate was positioned behind the tip hider 220*b*, the mail piece would be guided by flange 232*a* to rest to the left of mail piece 260. Mail piece 260, mail piece 262 and mail piece 264 form a packet or group of mail pieces. These mail pieces may be completely overlapped or partially overlapped. Partially overlapped mail is often termed shingled mail but, in either event, the mail pieces are grouped as a single group or packet of mail pieces. As shown in FIG. 2, mail piece 262 is grouped with mail pieces 260 and 264, however, the mail pieces are not perfectly aligned to form a congruent overlapped package. Congruent overlapped groups, partially overlapped groups or shingled groups, which are significantly less overlapped, are all equally employable with the present invention and the present system. The arrangement of each group depends on the type of separator system employed. These separator systems can be controllable feeders, controllable singulators, that selectively are controlled to shingle feed mail pieces, releasable hold stations or a combination of these systems. Any mechanism suitable to group mail pieces or media items may be employed as the separator system. When all the sortation bins are on only one side of the transport path, the diverter gate 230 can be fixed in a single position to achieve the desired layering of the mail pieces for multipass sortation processes. Any mechanism which causes additional mail pieces to be placed on the desired side of the group of mail pieces may be used in place of the described diverter gate 230 including end pivot diverters, and moveable or fixed channels.

When a suitable group of mail pieces is assembled in the hold station 240, a solenoid 242 or other suitable mechanism is actuated to retract the mail retard gate from its blocking position 250 shown in FIGS. 1 and 2 to its open position 244 shown in FIG. 2. This allows further transit of the mail piece group as a single group or packet of mail pieces along the mail piece transit path 207. Thus, unless the grouping occurred prior in the system, such as, at the pick-off feeder 206 or at the feeder 218, either of which may provide shingled feeding of the mail pieces, the grouping occurs at the hold station 240 to allow a group of mail pieces to be transited along the mail path as a single packet. The group of mail is transported and handled as if it were a single piece of mail which enhances the efficiency and processing speed of the sorter system 2. The thickness sensor 208 may be employed if the information about the thickness of the mail piece is not otherwise available to determine how many pieces of mail should be fed into the hold station or other station. The thickness of any group of mail that can be properly processed as a single packet depends upon the geometry of the equipment. When adding another mail piece to the group would exceed the predetermined thickness for specific equipment, the group is released to proceed. A new group, even if destined for the same sortation bin, is started. Moreover, if the next incoming mail piece 211 is destined for a different sortation bin than the group of mail pieces in the hold station 240, then the mail piece group would be released for transit whether or not it is approaching the predetermined thickness. Depending on the specific mail piece stream and the specific sortation plan, individual mail pieces as well as groups of mail pieces may be released at the hold station 240 for transit toward the sortation bins.

Figure 3:
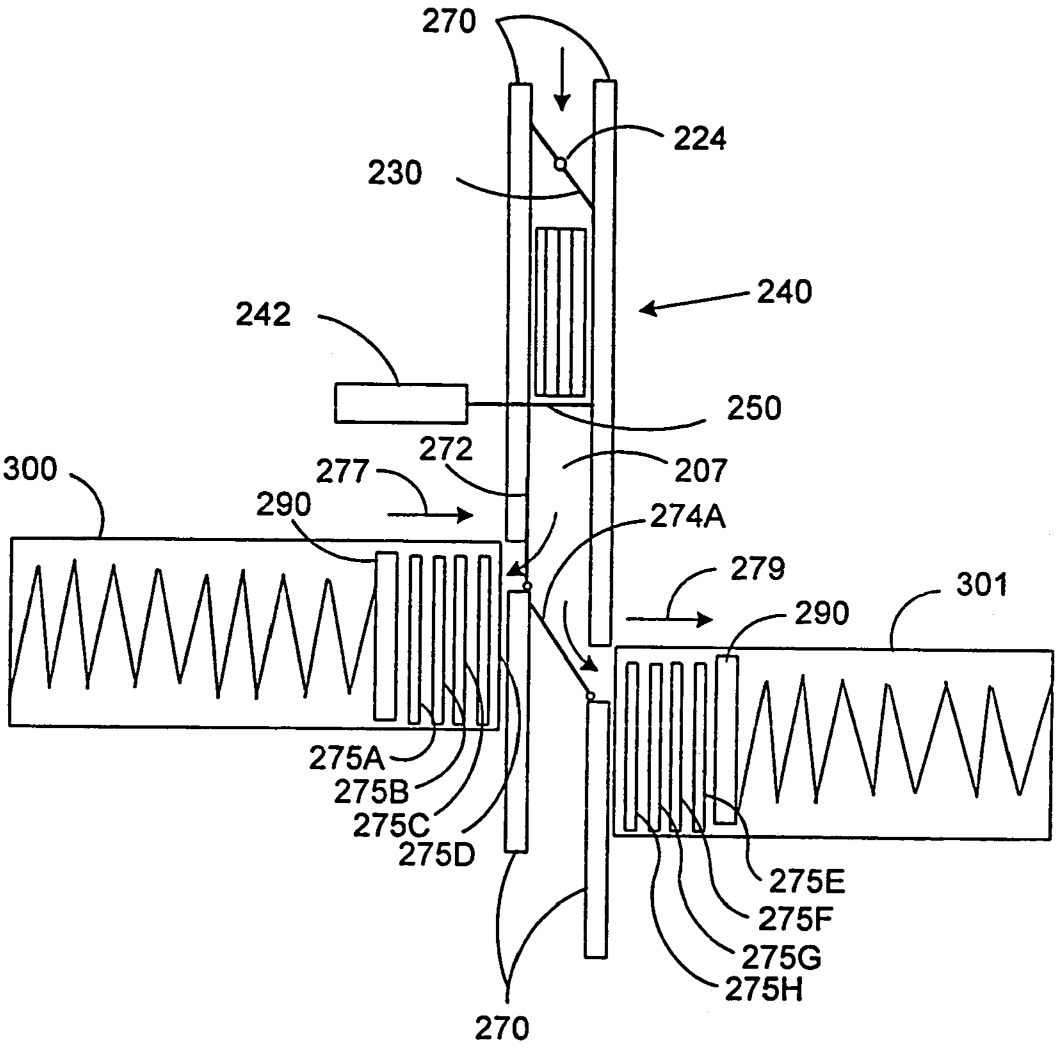
FIG. 3 is a diagrammatic view of shingled mail pieces being diverted to opposite sides of the transport path with the mail pieces ordered front to back (A-D) on one side of the transport and back to front (H-E) on the other side of the mail piece transport (the back sides of all mail pieces are visible)

Reference is now made to FIG. 3. Mail pieces traveling along the mail piece transit path 207 are diverted by the bin diverter 272 into the bin 300 and the mail pieces traveling down the transit path 207 are diverted by bin diverter 274*a* into bin 301. Because of the operation of the diverter, the mail in bin 300 is ordered with the mail pieces showing ordered as A, B, C and D based on their flow down the transit path 207. On the opposite side of the transit path, because of the operation of the diverter, the mail in sortation bin 301 is ordered as H, G, F and E based on their flow down the transit path 207. Consistent ordering of the mail pieces on the left side sortation bins of the machine allows them to be combined and processed further. Independently, the consistent ordering of the mail pieces on the right side sortation bins of the machine allow them to be combined and processed further. Within a radix sort (e.g. after pass 1), the mail sequence is not preserved if mail is merged across the two sides of the system configuration.

The address-bearing side of the mail in sortation bin 300, which may have been read, for example, by the OCR reader 214, is shown facing right, 275*d* being the address side on mail piece D, 275*c* being the address side on mail piece C, 275*b* being the address side on mail piece B and 275*a* being the address side on mail piece A. For the mail in sortation bin 301, 275*e* is the address side for mail piece E, 275*f* is the address side for mail piece F, 275*g* is the address side for mail piece G and 275*h* is the address side for mail piece H. All of the mail piece addresses are oriented in the same direction but are differently oriented when viewed from the mail piece transport belt path 207. Thus, the addresses of the mail piece in sortation bin 301 face away from the transport path 207 while the addresses of the mail pieces in sortation bin 300 face toward the transport path 207. Accordingly, the direction of the address for the face of the mail pieces shown in sortation bin 300 are facing in the direction of the arrow 277 toward the transport path 207 while the direction of the facing of the mail pieces in sortation bin 301 is in the direction of the arrow 279 away from the transport path 207. In both cases, the addresses and the arrows are in the same direction since the mail piece faces were oriented so as to be processed by the various stations along the mail piece transit path 207. Due to the operation of the order diverter 230, the groups of mail are structured to produce the internal layer sequence necessary to match the overall layer sequence of mail in the destination sortation bin. Without this diverter, mail could be in random sequence within a group or in the correct sequence for one side (e.g. left side sortation bins) of the sorter but the wrong sequence for the other side (e.g. right side sortation bins) of the sorter. The sorter operates in a manner such that in subsequent sortations, this orientation is retained within each group of mail being transported down the transport path 207. The operation of the diverter 230 allows control of the sequence of the mail pieces within each of the groups.

The problem of mail stacking in opposite sequences on the right side sortation bins and left side sortation bins sides of the transport track may be avoided by building a sorting machine with sortation bins on only one side of the transport. Folding the transport over on itself can produce a double sided sorting machine with all sortation bins on the same effective side of the transport. The transport path shape may be that of a "J", a "U", a "hair pin" or other folded transport path shape. In this event, all mail can be merged for subsequent radix sorts and the order diverter 230 can be fixed in the position that correctly layers mail within bundles for the transport design (stacking on right or stacking on left). The present invention of the order diverter 230 is still necessary to ensure that mail is correctly layered within the bundles.

Figure 4:
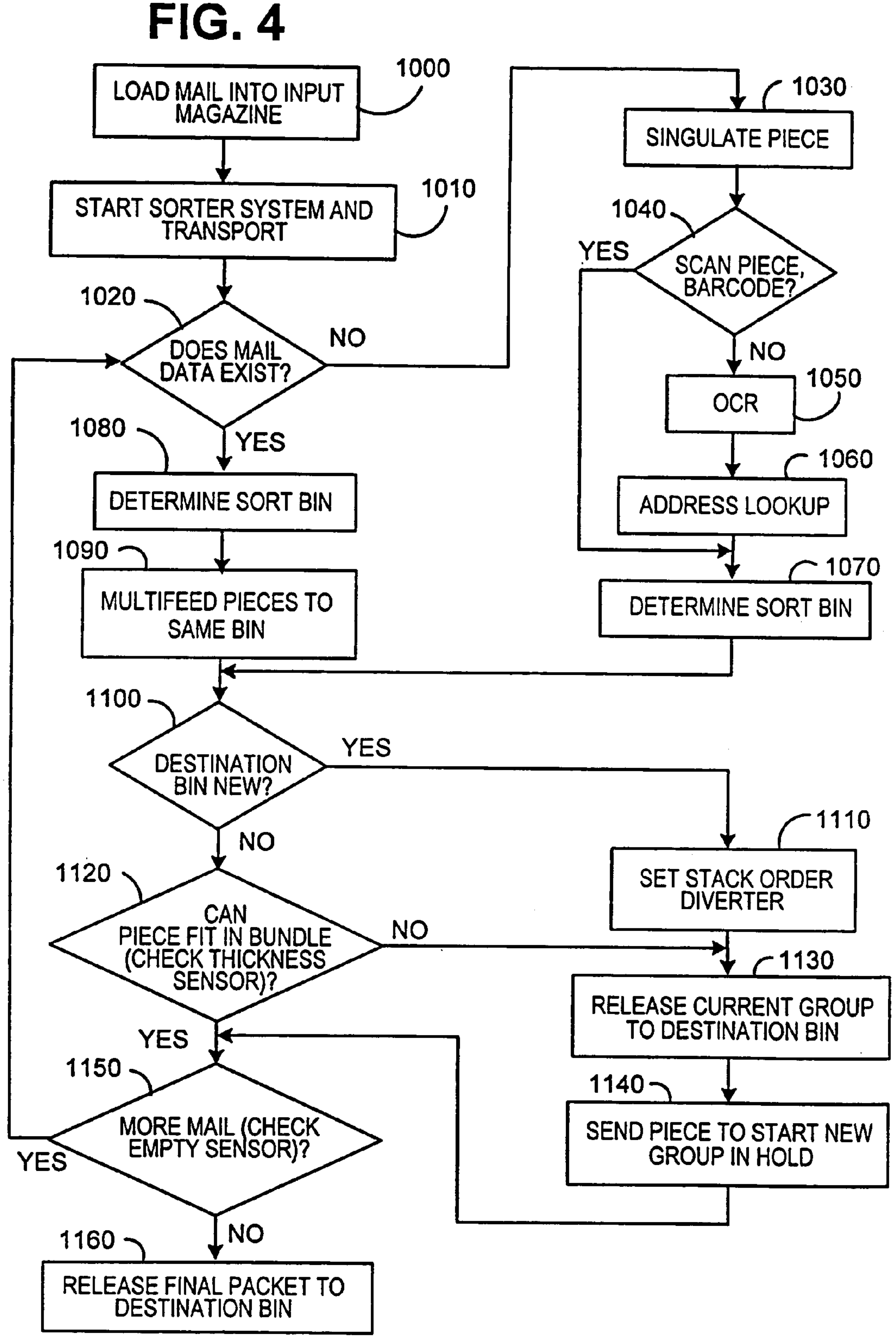
FIG. 4 is a flow chart of the operation of the mail piece sorter system shown in FIG. 1.

Reference is now made to FIG. 4. Mail is loaded into the input magazine at step 1000. The sorter system and transport are started to operate at 1010 and a decision is made at 1020 whether a pre-existing mail data 330 exists that might be used in operation of the system. If pre-existing mail data exists, a determination is made at 1080 as to which sortation bin the mail piece being fed onto the transport is destined. A determination is then made whether subsequent mail pieces in the stack to be processed are destined for the same sortation bin at 1090 and such pieces are multi-fed or grouped for transit to the same sortation bin. A decision is made at 1100 if the group of mail pieces is destined for a new sortation bin. If the group is not destined for a new sortation bin, the process continues at 1120 with a decision made as to whether the mail piece can fit into the group without exceeding a predetermined thickness. This may be implemented by data from the thickness sensor 208 or the pre-existing mail run data file 330. If the mail piece can fit into the group, the process proceeds and a decision is made at 1150 whether there is more mail in the mail magazine 200. If more mail exists, the process loops back to decision block 1020 and the process repeats. If no further mail is present in the magazine, at 1160 the mail group is released for transit as a single packet to the destination sortation bin.

In the instance where mail piece data does not exist at decision block 1020, the mail piece is caused to be singulated at 1030 and a decision is made at 1040 whether a bar code has been successfully scanned. Where the barcode has been successfully scanned, a determination is made at 1070 as to a destination sortation bin and the process loops back to decision block 1100. The process thereafter continues as previously described. If no barcode is scanned at 1040, an optical character read (OCR) of the mail piece is implemented at 1050 and a database look-up is initiated and an address look-up is implemented at 1060. A determination is thereafter made at 1070 to determine the sortation bin. After a determination of the sort bin is made at 1070, the process continues at decision block 1100.

When a determination is made at decision block 1100 that a new destination sortation bin is required for the group of mail pieces, the stack or mail piece group order diverter is set at 1110 to achieve the proper orientation of the mail pieces for the new destination sortation bin. Thereafter, the current mail piece group in the hold station is released for transit to the destination sortation bin at 1130. At 1140, the system is caused to start a new mail piece group or packet and the process returns to decision block 1150.

Figure 5:
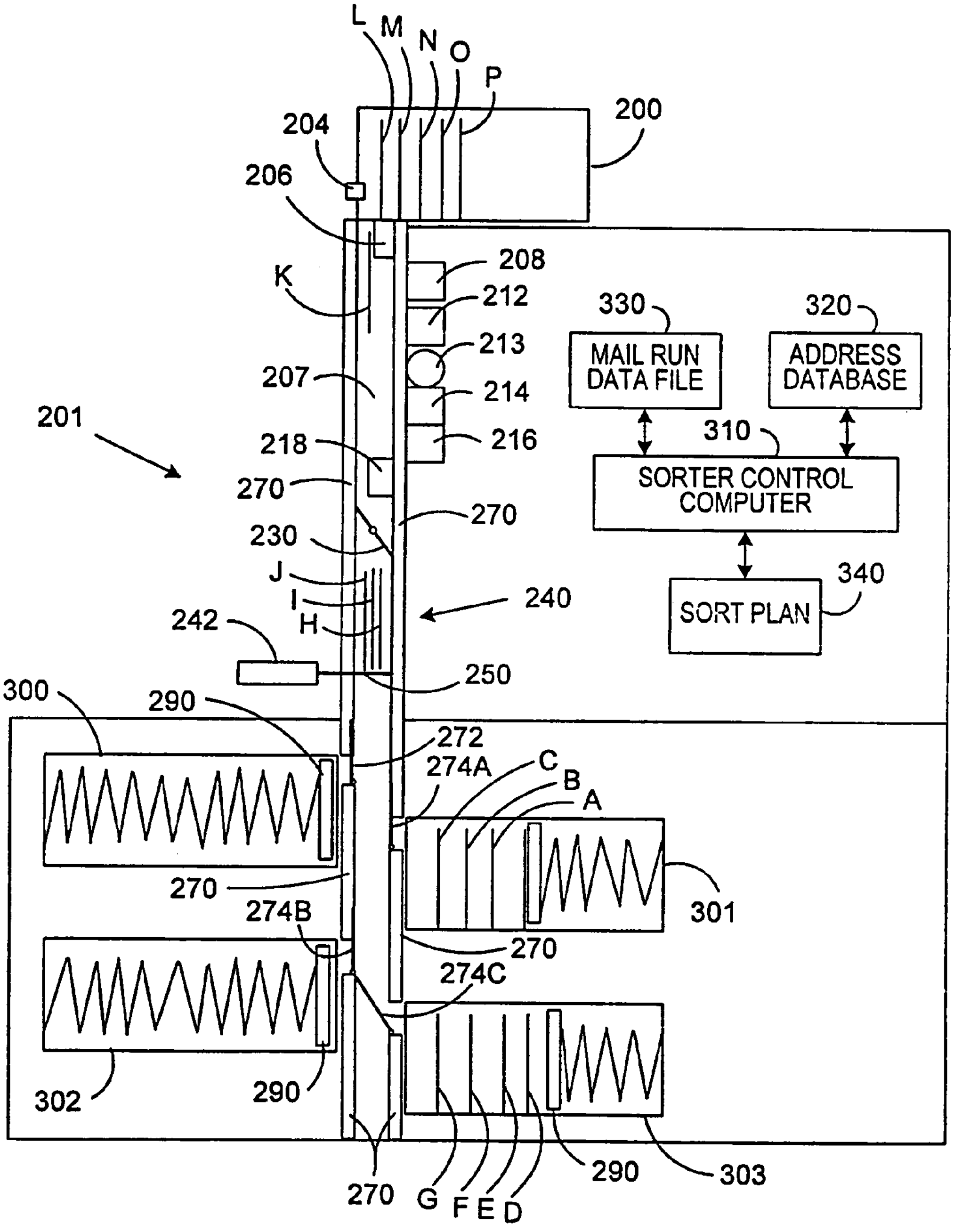
FIG. 5 is the mail piece sorter system shown in FIG. 1 with mail pieces each represented by capital letters in various stations of the sorter system helpful in an understanding of the operation of the system.

Reference Is now made to FIG. 5. The mail piece magazine 200 includes five mail pieces each labeled L, M, N, O and P. A mail piece K is in transit along the mail piece transport path 207 and mail pieces are in the hold station diverted to be in the order, left to right, of J, I and H. Mail pieces are shown in the sorter bin 301 oriented C, B and A and in sortation bin 303 oriented G, F, E and D. Thus, when mail pieces J, I and H are released from the hold station 240 and transit along the mail transport path 207, they will be diverted into sortation bin 301 and oriented J, I and H to continue the same layering sequence as the mail pieces already in sortation bin 301. Thus, the diverter preserves the layering of the mail in the sortation bin, which is required for subsequent sortation of the mail pieces.

Figure 6:
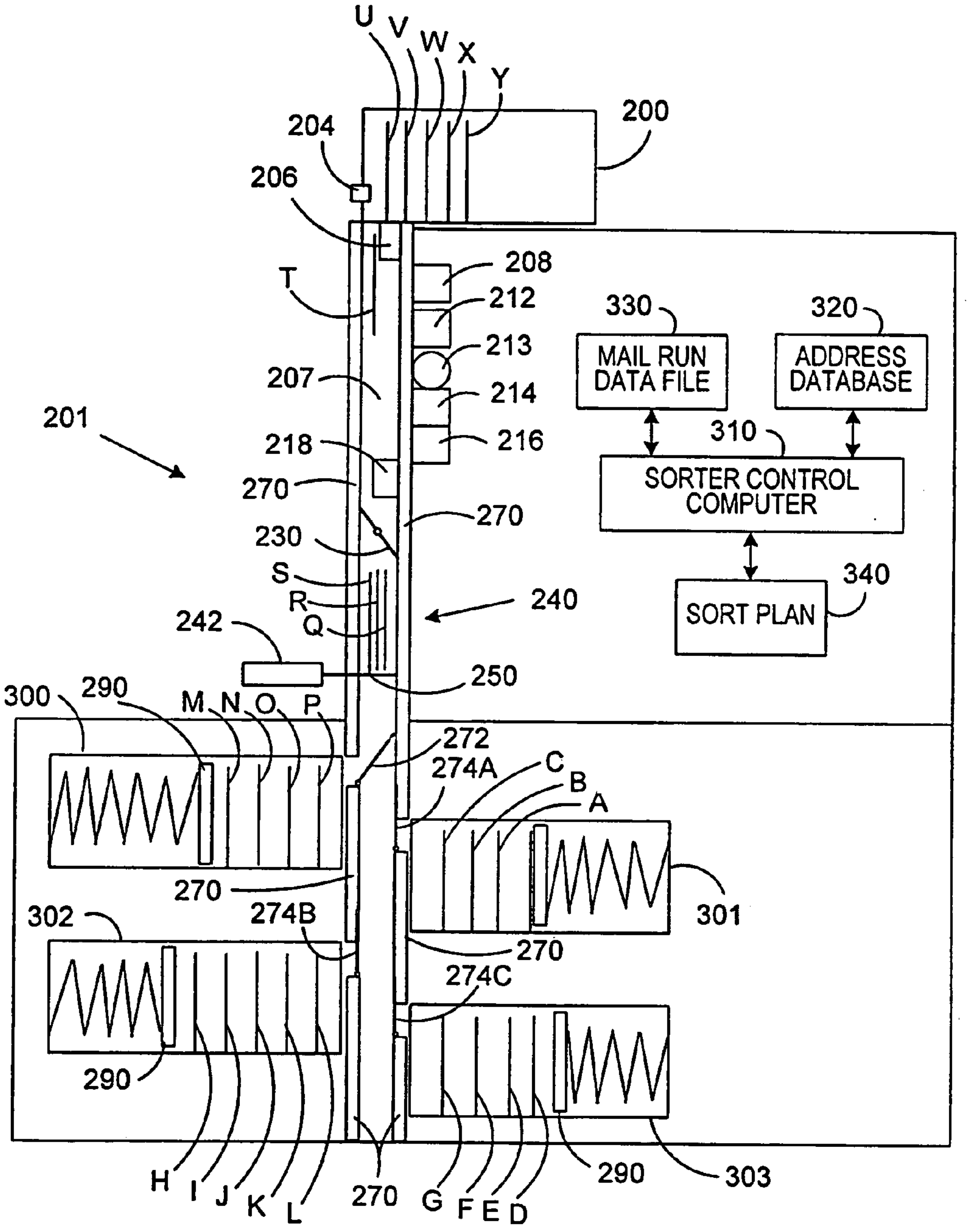
FIG. 6 is the mail piece sorter system shown in FIG. 1 with mail pieces each represented by a capital letter in various stations of the sorter system and in different mail piece sets in the sortation bins on opposite sides of the mail transport path helpful in an understanding of the operation of the system.

Reference is now made to FIG. 6, which shows mail pieces U, V, W, X and Y in the mail magazine 200, with mail piece T in transit on mail piece transport path 207. Mail pieces S, R and Q are at hold station 240, with various mail pieces as shown by the letters in the four-sortation bins. The mail pieces in sortation bin 300 are layered M, N, O, and P from left to right and mail pieces in sortation bin 302 are layered H, I, J, K, and L from left to right. In sortation bin 301, the mail is in the order C, B and A and in sortation bin 303, the mail is also in the order G, F, E and D. Mail pieces S, R and Q at hold station 240 have been layered by diverter 230 such that when these mail pieces travel along the mail piece transport path 207 and are moved into sortation bin 301, they will retain the proper sequence with respect to the mail already in sortation bin 301. Thus the operation of the order diverter 230 retains or creates the proper orientation of mail pieces In a group of mail pieces based on the destination sortation bin. Accordingly, further sortation of the mail pieces combined from the right side sortation bins or the left side sortation bins can be implemented to make the mail sortation more specific or detailed in relation to delivery order sequence. Accordingly, further sortation of the mail pieces combined from the right side sortation bins or the left side sortation bins sortation bins can be implemented to make the mail sortation more specific or detailed in relation to delivery order sequence.

If the mail in the hold station 240 were destined for transport to the sortation bin 300 or sortation bin 302, the diverter 230 would have been set in the opposite orientation and the mail in the hold station would be reversed in its orientation such that the orientation, rather than being oriented or layered S, R and Q, as shown in FIG. 6, the mail piece orientation or layering would be Q, R and S. And, if such mail group (Q, R and S) were then transported and moved into sortation bin 300 or sortation bin 302, the mail piece group would maintain the ordering of the mail pieces already moved in to those sortation bins.

To facilitate enhanced processing, it may be desired to create a sortation plan such that mail in bin 300 and 302 on the left side of the transport path as viewed in the various figures (left side sortation bins) are destined for a particular geographic area while mail in sortation bin 301 and 303 on the right side of the transport path as viewed in the various figures (right side sortation bins) are destined for a different geographic area. In this manner, when subsequent radix sortations are made, the right side sortation bins side layering will be preserved for one set of mail while the left side sortation bins layering is preserved for the other set of mail. In effect the sorter is being divided into two separate but concurrent sorters.

Figure 7:
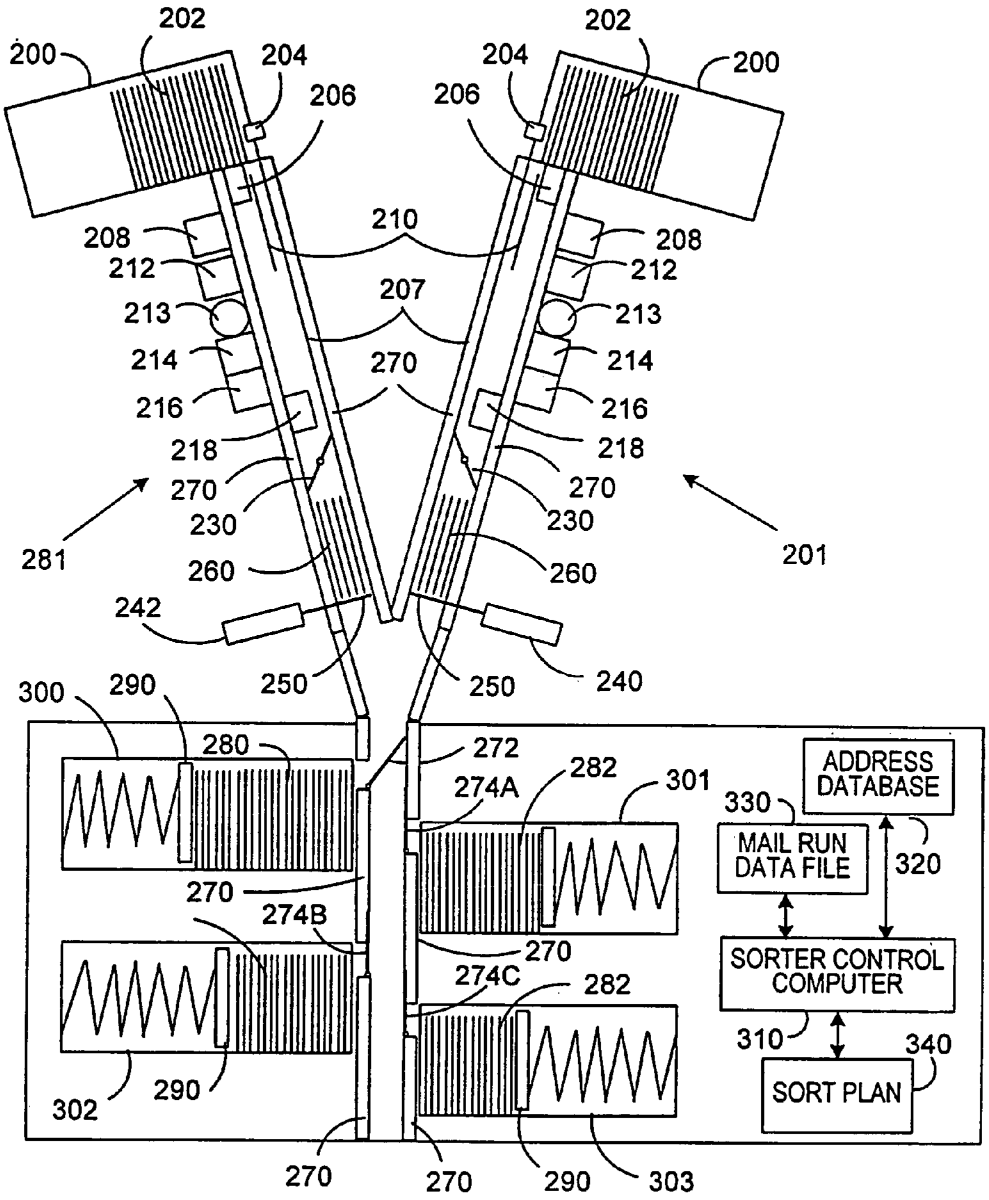
FIG. 7 is a diagrammatic view of a mail piece sorter system embodying the present invention and employing two feeder and input sections.

Reference now is made to FIG. 7. The sorter system 2 includes two separate feeder arrangements to facilitate a higher volume of mail being processed. An additional separate feeder and input section, shown generally at 281, is provided. This feeder and input section 281 operates in a similar fashion to the feeder and input section 201 previously described. While the feeder and input section 281 is shown as a mirror image of the feeder and input section arrangement 201, this is not necessary and it can be of the same orientation. Since mail piece feeding and scanning/reading processes are often the limiting process steps in sortation of mail, by having plural input feeder and scanning/reading systems, the throughput of the sorter system 2 overall throughput and processing speed is enhanced. This arrangement enables the processing of mail pieces as groups of mail destined for the same sortation bin. Thus, groups of mail pieces from one feeder (mail facing left) can be processed by left side sortation bins of the sorter, while a group of mail pieces is being formed in the other feeder section (mail facing right) of the equipment for sortation to the right side sortation bins of the sorter. This allows the transport section to run at optimum speed while groups of mail pieces are being assembled for processing in the multiple feeders. Additional feeder stations and feeder and input sections can be added to the sorter system 2.

Figure 8:
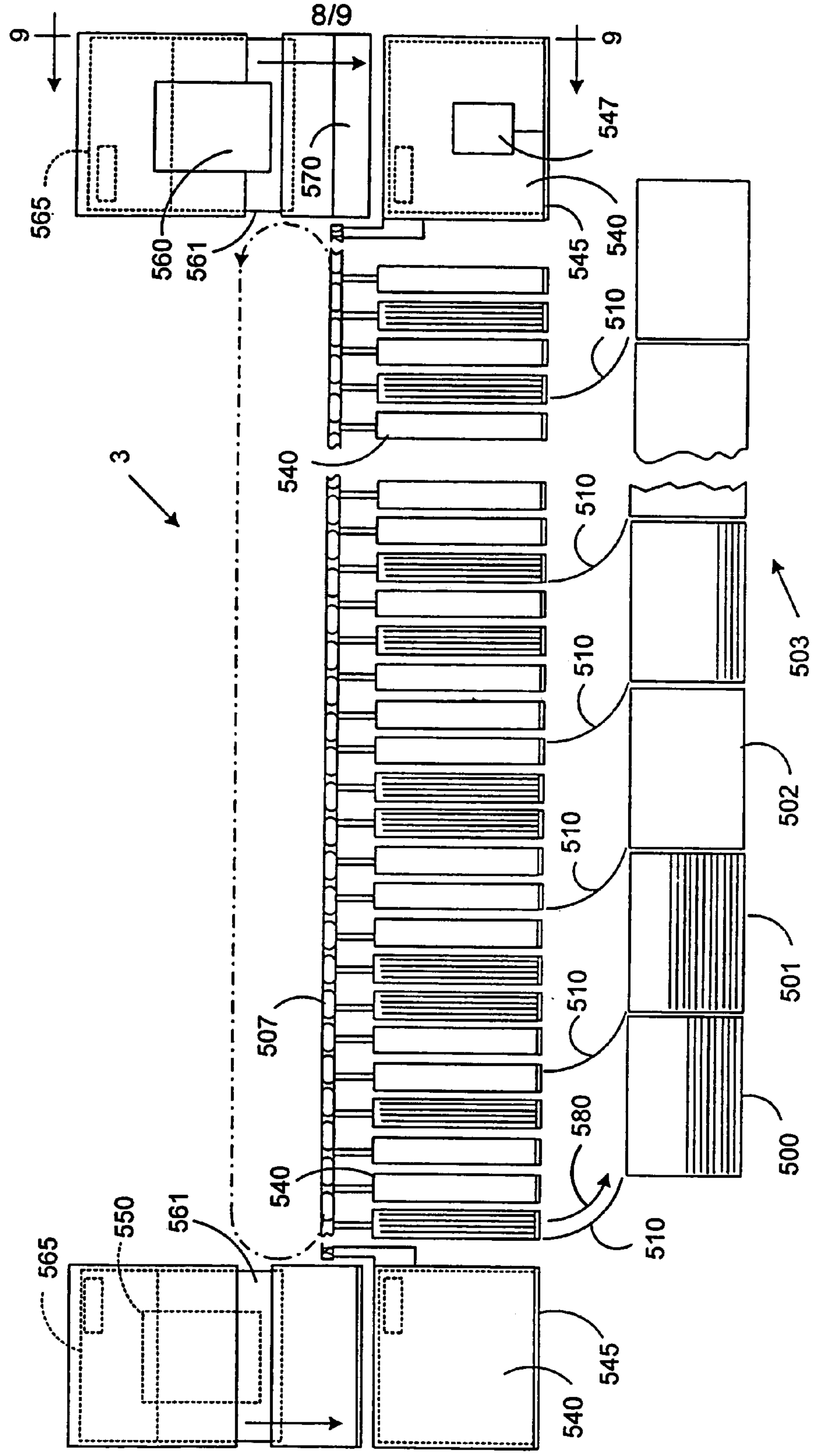
FIG. 8 is a diagrammatic side view of a large media item sorter system embodying the present invention employing transport carriers and with multiple feeders; and, FIG. 9 is an enlarged, detailed side section diagrammatic view of the part of the sorter system shown in FIG. 8 helpful in understanding of aspects sorter system media item feed stations, the media item transport carrier modules and media items sortation bins.

Reference now is made to FIG. 8 showing a diagrammatic side view of part of a media item sorter system 3 particularly suitable for media items such as flats and other suitable media. The sorting system 3 employs a plurality of flats transport carrier modules such as carriers 540. The carriers provide escorted transport for flats, such as flats 561 and 565, fed into the carriers at flats feed stations 550 or 560. The sorter system 3 may have additional flats feeders to those shown in FIG. 8. The carriers are moved along an endless loop sorter system transport path, such as a circular or oval path, by a drive chain 507. The carriers are moved along the transport path past the various flats sortation bins such as sortation bins 500, 501, 502 and others shown generally at 503. The sortation bins are positioned below the moving carriers. Each moving carrier is emptied and the flats slide down a chute 510 into a destination sortation bin when the carrier is positioned over the destination sortation bin. One flats sorting system employing movable carriers which are moved to sortation bins and that is suitable to be modified for use with the present invention is the USPS advanced flats sorting machine (AFSM) model 100.

The moving carriers 540 for flats provide escorted transit of flats and a similar functionality to the hold station 240 shown in FIGS. 1 and 2 in connection with the previously described transport system for unescorted mail pieces. The plurality of carriers, such as carrier 540, contain groups of layered flats to provide escorted transport for the group to a destination sortation.

The carrier 540 containing the group of flats will be moved in a continuous loop from feeder 550 by the chain drive 507. Upon arrival at the destination sortation bin, the group of flats is released from the carrier 540 for movement in the direction of arrow 580 down the chute 510 into the designated sortation bin such as sortation bin 500. When the carrier 540 is in the proper position above sortation bin 500, the carrier trap door 545 in the bottom of the carrier 540 is released by solenoid 547. This allows any flats in the carrier to move downward in the direction of arrow 580 into the destination sortation bin 500 below the carrier transport path. The flats which are loaded into the carrier from the top of the carrier are layered in a similar manner to that described in connection with FIGS. 1 and 2 to preserve the radix sort integrity in the carrier by an order diverter 570. The group of flats are layered due to the position of the order diverter 570 so as to be loaded or fed into the carrier 540 to be a group of layered media items suitable for the destination sortation bin 500 and to maintain the layering of any flats that may have been previously moved into the sortation bin. Thickness sensors may be employed to insure the carrier is not overloaded beyond its capacity.

Figure 9:
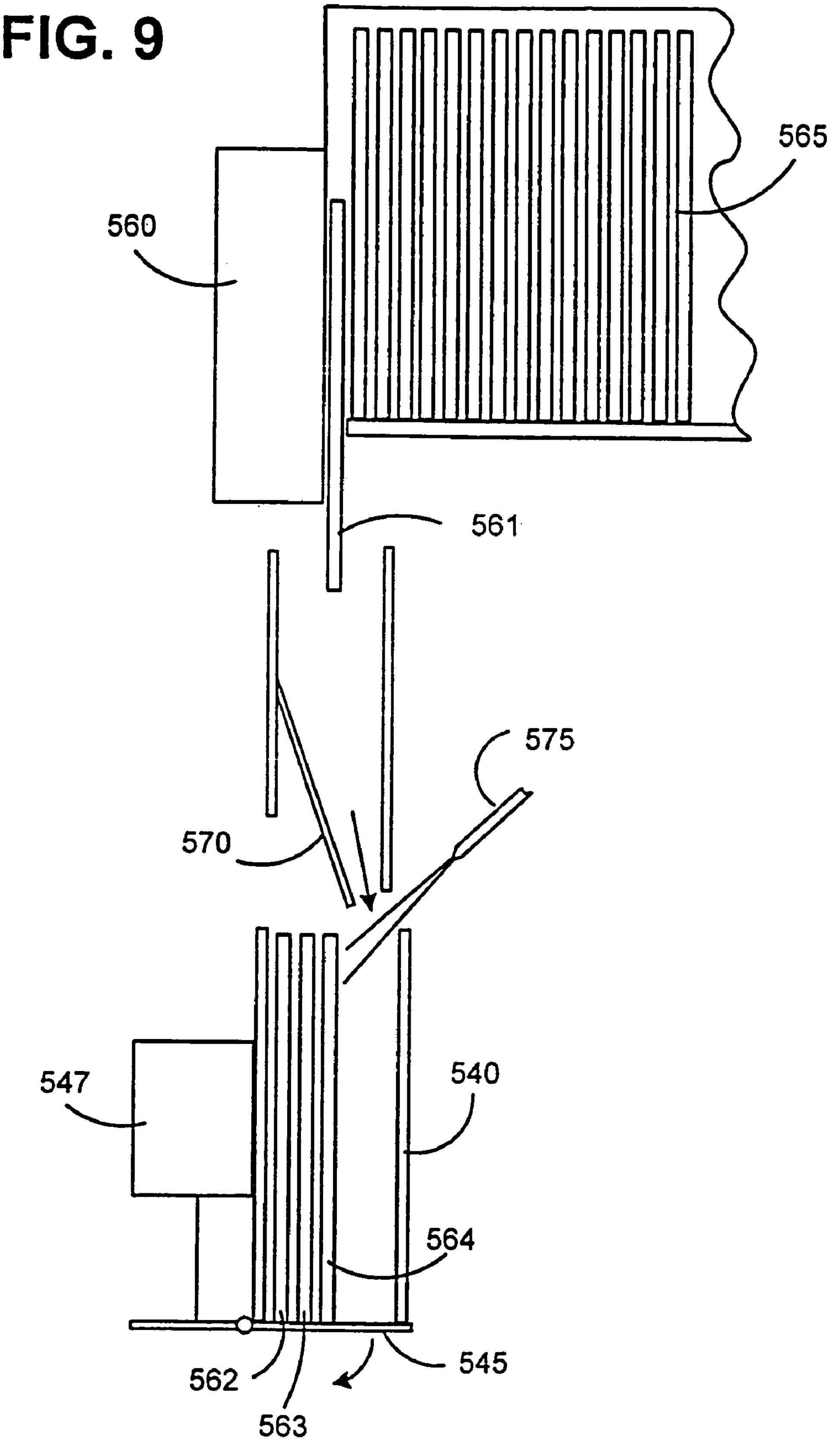

Reference now is made to FIG. 9 showing an enlarged detailed side section of part of a media item sorter system 3 particularly suitable for loading media items such as flats and other suitable media into carriers. Depending on the flats to be processed and the destination sortation bin, a carrier may contain only a single flat. The carrier 540 is loaded by flats feeder 560 with flats from the stack of flats 565. The flats such as flat 561 are moved through an order diverter shown at 570 and into the carrier 540. The order diverter operates similar to the order diverter shown in FIGS. 1 and 2. When flat 561 moves into the carrier 540, the diverter gate 570 as positioned will cause the flat to be adjacent flat 564 of the group of flats 562, 563 and 564. A compressed air jet 575 may be used to align existing mail pieces to the left of the carrier 540 so that the incoming piece 561 may freely fall into the carrier on the right side. Alternative means to left justify the mail pieces could also include a plastic insert in the carrier 540 to slope the floor, a spring member to align the mail pieces, a cam operated moving finger in the transport base that tilted the carrier, or a finger on a moving belt beneath the carrier. Any suitable arrangement can be employed which properly positions the existing mail pieces in the carrier to allow the incoming mail piece to be properly sequenced in the group of mail pieces. Such mechanisms may be implemented only at the feeder stations where the carriers are being loaded and/or if desired in the various carriers themselves.

Grouping of the flats in the sorting system 3 provides particular benefits in both radix sort modes and in first pass, not layer sensitive, modes. It should be recognized that the escorted transport sorting system described in connection with FIGS. 8 and 9 can be employed with any media item including any mail pieces. This arrangement can be retrofit onto many existing flats sorter systems with minimal capital cost. Such retrofit would greatly increase the throughput and processing efficiency of the sorter system through the introduction of modified separator systems as described above. Multiple flats can be added to the carrier if they share a common destination sortation bin. Furthermore, a carrier containing flats (or other media items) can pass multiple feeders or loading stations and accept additional flats if there is space remaining in the carrier and the additional flat is destined to the same sortation bin. This minimizes problems with many existing flats sorter systems where the systems run at very slow speeds because of the difficulty of handling the large pieces and the transport throughput limitations related to waiting for an available empty carrier. With the present arrangement, any adjacent flats with a shared destination can be merged and passing partially loaded and empty carriers can be multitasked. The order diverter 570 can still be utilized to sequence mail within the carriers if a radix sort is being utilized.

It may be desirable for the flats feeder, such as feeder 550, to be controlled to hold a flat for an approaching or nearby flats transport carrier going to the desired sortation bin. In this manner, an empty or partially loaded carrier can be preserved and employed for other mail pieces destined for a different sortation bin and may be loaded by another feeder connected to the transport system. Similar to the system described in connection with FIGS. 1 and 2, the sorter system 3 operates by utilizing information about the flats or media items. The information and, in particular, information concerning the contents of the various carriers connected to the carrier transport path and their destination sortation bins is employed to maximize the carrier utilization and maximize the overall throughput of the system. The various separator systems connected to the carrier transport path are controlled such that information about the contents of various of mail piece carriers, their destination sortation bins, their position on the transport system and the destination sortation bins of mail pieces in the awaiting to be processed by various separator systems are employed to maximize the utilization of the various carriers. This enables mail pieces to be consolidated in appropriate mail piece carriers for escorted transport to the destination sortation bin.

As shown in FIG. 9, flats group 562, 563 and 564 form a congruent package. The arrangement of each group of flats depends on the type of separator system employed. These separator systems can be controllable flats feeders, controllable singulators, that selectively are controlled to shingle feed flats, order diverters and associated carriers or a combination of these systems. Any mechanism suitable to group flats or media items may be employed as the separator system. Depending on the physical arrangement of the sortation bins, the order diverter 570 can be fixed in a single position to achieve the desired layering of the flats for multipass sortation processes. Any mechanism which causes additional flats to be placed on the desired side of the group of flats may be used in place of the described order diverter 570 including end pivot diverters, and moveable or fixed channels.

It should be recognized that the various systems and methods described above in connection with the figures may be employed with any media items to be processed that are suitable for grouping, feeding and, if the process involves sortation, for movement into destination sortation bins. The term media item is intended herein to be a broad term and to include media items such as various types of mail pieces such as letter mail, postcards and flats. The USPS considers mail pieces to be flats when the mail piece exceeds at least one of the dimensional regulations of letter-sized mail (e.g. over 11.5 inches long, over 6 inches tall, or over ¼ inch thick) but does not exceed 15 inches by 11.5 by ¾ inch thick. Flats include such mail as pamphlets, annual reports and the like. Other examples of media items include sheets of paper, checks, compact discs, DVD discs, books, packages of greeting cards, and any other machineable items that can be sorted or sequenced on automated processing equipment. Accordingly, while the detailed description is directed to the processing mail pieces, any other suitable media item can be substituted for the mail pieces in the description. Where the process involves sortation, a sortation plan would be employed which is appropriate for the type of media, the particular application and the specific sortation equipment employed. Any arrangement for the separator system and the ordering system may be employed to group and when desired to order media items. Where the process involves sortation, various sortation systems may be employed. These sortation systems may, for example, process mail in a horizontal (lying down) rather than a vertical (on edge) orientation and they may move the mail as described above unescorted or escorted, contained within a carrier, as is common on flats sorting systems because of the difficulty of handling such a wide range of materials.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A mailpiece sorter system comprising:

a mailpiece feeding assembly operative to selectively feed mailpieces singularly or in groupings of mailpieces consisting of more than one mailpiece wherein each said mailpiece is at least partially overlapped with respect to another said grouped mailpiece;

a mailpiece sortation assembly operatively coupled to said mailpiece feeding assembly and having a plurality of mailpiece sortation bins and a diverting assembly for directing fed mailpieces into a predetermined one of said plurality of mailpiece sortation bins; and a control system operatively coupled to said mailpiece feeding assembly to determine which mailpieces are to be singularly fed from said feeding assembly and which mailpieces are to be fed from said feeding assembly in a predetermined grouping of mailpieces.

2. The mailpiece sortation system as recited in claim 1 wherein the control system is further coupled to the mailpiece sortation system for controlling the diverting assembly to determine which of said plurality of mailpiece sortation bins is to receive mailpieces feed from said mailpiece feeding assembly.

3. The mailpiece sortation system as recited in claim 1 wherein said control system is further operative to control said mailpiece feeding assembly to limit the thickness of each grouping of mailpieces not to exceed a predetermined thickness and to separate and feed any subsequent mailpieces which would cause said grouping of mailpieces to exceed said predetermined thickness.

* * * * *